Figure 3:
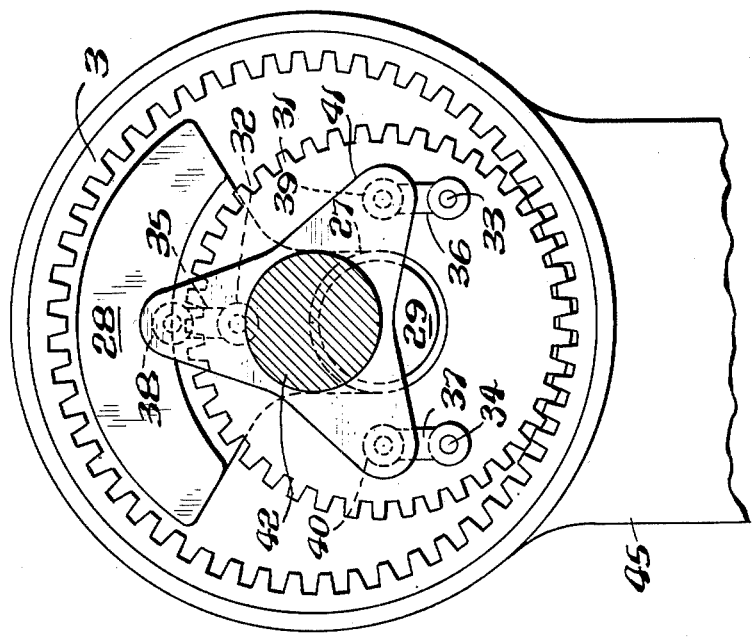

April 25, 1950
J. S. SHARPE
2,505,745
TRANSMISSION MECHANISM
Filed Sept. 13, 1944
3 Sheets-Sheet 1
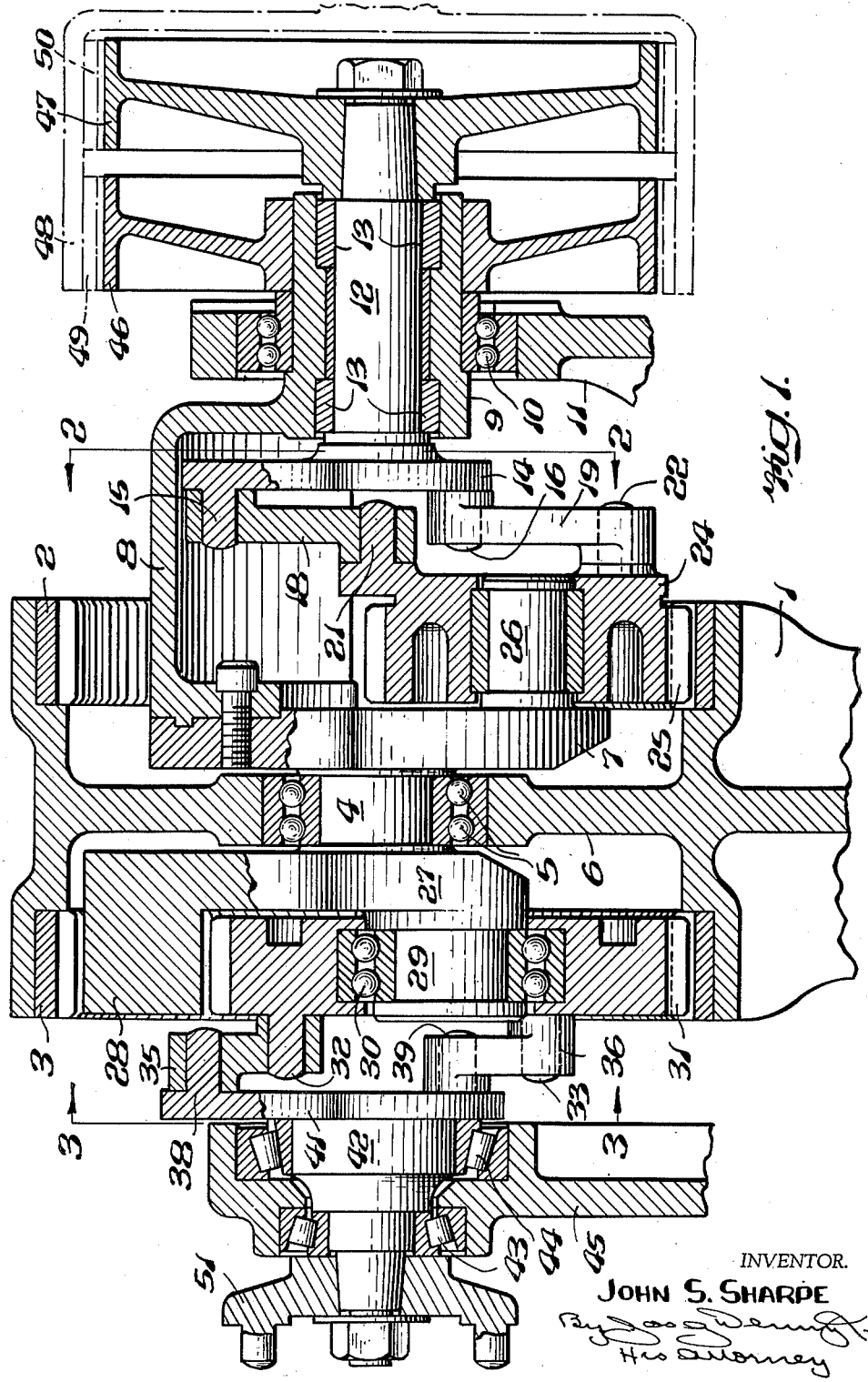
INVENTOR.
JOHN S. SHARPE April 25, 1950 J. S. SHARPE 2,505,745
TRANSMISSION MECHANISM
Filed Sept. 13, 1944 3 Sheets-Sheet 2

INVENTOR.
JOHN S. SHARPE
BY
His Attorney

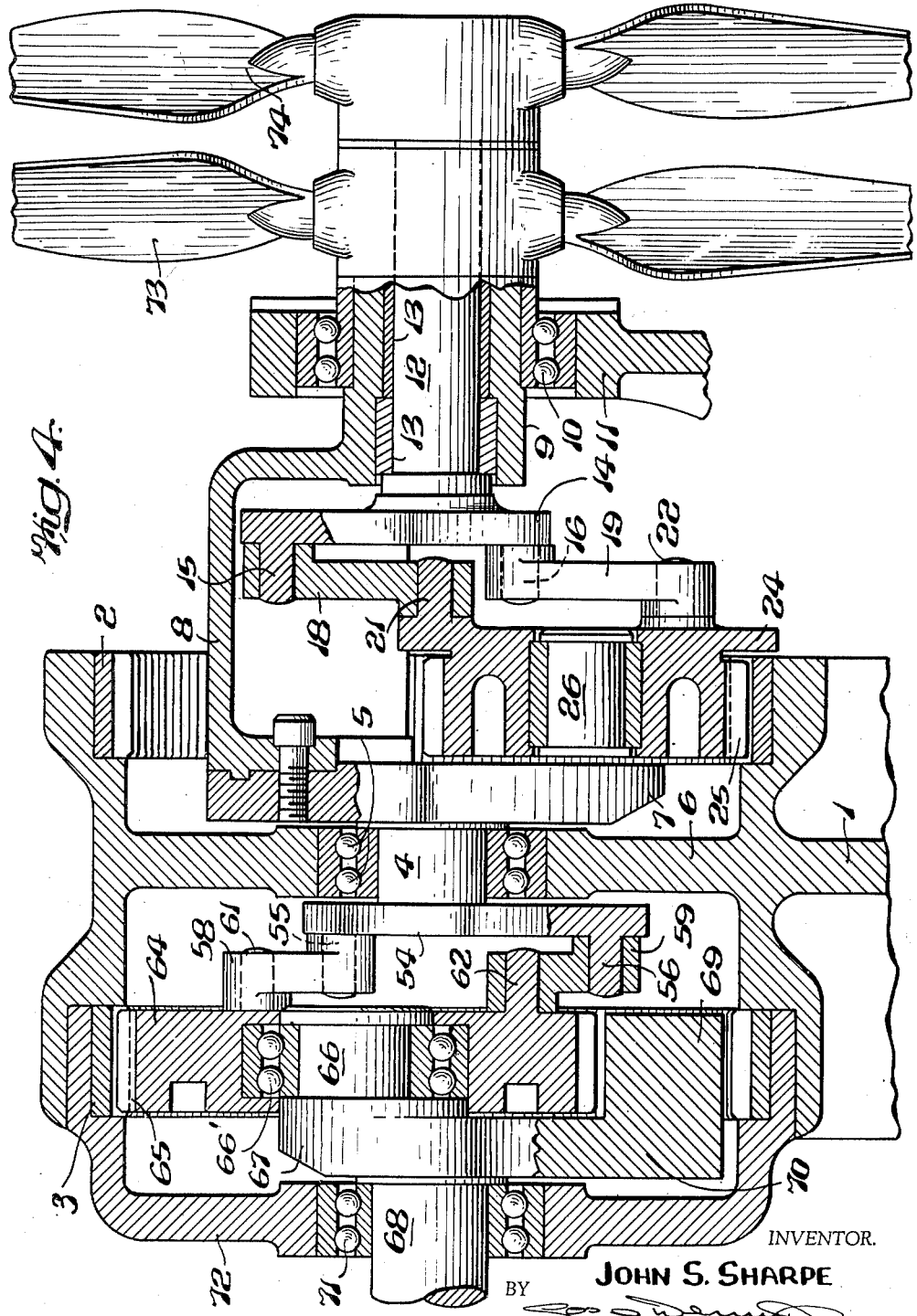

Patented Apr. 25, 1950

2,505,745

UNITED STATES PATENT OFFICE 2,505,745

TRANSMISSION MECHANISM

John S. Sharpe, Haverford, Pa.; Catherine D. Sharpe, executrix of said John S. Sharpe, deceased, assignor to The Franklin Institute of the State of Pennsylvania for the Promotion of the Mechanic Arts, Philadelphia, Pa., a corporation Application September 13, 1944, Serial No. 553,815

11 Claims. (Cl. 74—804)

My invention is an improved transmission mechanism for transmitting energy from one rotating body to another so that the speed and torque of a driven member differs from the speed and torque of the driving member and, if desired, the driven member may be rotated oppositely to the driving member.

My improved mechanism comprises a series of coaxial, flexibly connected rotors, such as crank shafts, preferably three in number. The first rotor is connected with the second rotor by means including a flexible coupling, as for instance a connecting rod, and a wheel, such as a gear wheel. The second rotor is connected to the third rotor by a similar coupling and wheel, and the two wheels engage a track, preferably composed of internally toothed, stationary rings coaxial with the common axis of rotation of the rotors.

When rotary motion is transmitted from one rotor to a succeeeding rotor through my flexible coupling and tracking wheel, the direction of rotation of such succeeding rotor is opposite that of the prior rotor, and a third rotor driven from the second rotor through my flexible coupling and tracking wheel will rotate in the same direction as the first rotor.

When the pitch diameter of the tracking wheel between two rotors is one-half the pitch diameter of the internally toothed ring coacting therewith, the angular speed of rotation and torque of the rotors connected through such wheel will be the same. But when the pitch diameter of such gear wheel is greater than one-half the pitch diameter of the ring, the angular speed of rotation of the driven rotor will be less and its torque greater than that of the driving rotor. By properly proportioning the gears, rings, and throw of the rotor cranks, any desired speed reduction (or increase) may be attained. The speed and torque ratios may be altered by using a gear of different diameter and correspondingly changing either the ring or the throw of the rotor cranks cooperating therewith.

My improvements preferably include means by which energy may be transmitted to or from the intermediate rotor independently of one of the gears and couplings connected therewith. Such means preferably include an axial extension forming a hollow shaft coaxial with and partially overlapping one of the end rotors to permit the application of energy to or the derivation of energy from such rotor and shaft by juxtaposed devices.

While the tracking wheels are preferably gear wheels and mesh with a toothed track, wheels and track having complementary friction surfaces may be employed. Each wheel is journalled on one of the rotors connected therethrough and may be connected with the other of such rotors through any type of flexible coupling, such, for instance, as are illustrated in my Patent No. 2,170,733. Preferably, however, each flexible coupling comprises triple links or connecting rods pivotally connected at equidistant points to a spider on one rotor and at equidistant points to a tracking wheel journalled eccentrically on the next rotor. Counterbalances may be provided for the weight of the wheels and/or they may be arranged symmetrically around the common axis of the rotors so as to counterbalance one another.

My improvements provide a compact speed reducing and reversing transmission mechanism which permits the elimination of any rotating gear ring or housing and is statically and dynamically balanced. My improvements further provide a wide distribution of the load transmitted through the gear teeth, with a large proportion of rolling action between the gear teeth and a minimum of sliding action between such teeth, and consequent reduction in friction, vibration, wear and noise.

The characteristic features and advantages of my improvements will further appear from the following description of specific embodiments and the accompanying drawings in illustration thereof.

Figure 2:
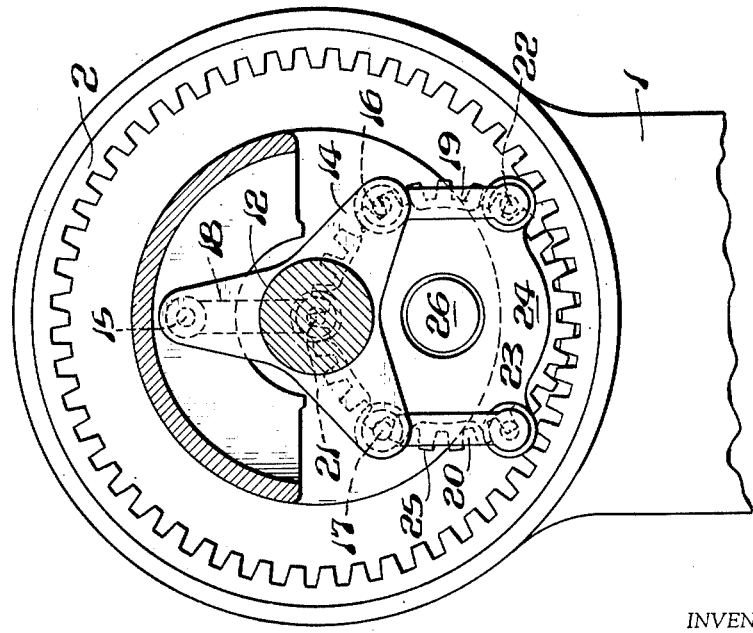

In the drawings, Figure 1 is a longitudinal sectional view of a transmission mechanism embodying my invention; Figure 2 is a transverse sectional view thereof, on a reduced scale, taken on the line 2—2 of Figure 1; Figure 3 is a transverse sectional view, on a reduced scale, taken on the line 3—3 of Figure 1; and Figure 4 is a longitudinal, sectional view of a modified form of transmission mechanism in which the power input and output are at opposite ends of the mechanism from those shown in Figure 1.

In the embodiments of my invention illustrated in the drawings, a frame 1 supports an annular track composed of internally toothed, coaxial rings 2 and 3, which are preferably of the same diameter and are detachably secured in fixed relative positions in suitable seats in the frame 1.

A rotor or crank shaft 4 is journalled in a roller bearing 5 seated in a web 6 of the frame 1 between the planes of the rings 2 and 3, the shaft being coaxial with such rings.

One end of the rotor or shaft 4 has fixed thereon a crank which may be in the form of a disk or flange 7. The disk 7 has bolted to one side thereof a counterweight and extension consisting of a semi-cylindrical flanged shell 8 terminating at its outer end in a hollow shaft 9 which is journalled in a roller bearing 10 mounted in a bracket 11 of the frame 1.

A rotor or crank shaft 12 is journalled in antifriction bearings 13 within the hollow shaft 9 and is coaxial therewith. The inner end of the rotor or crank shaft 12 is provided with a crank preferably consisting of a disc or triple arm spider 14 provided with arbors 15, 16, and 17 equidistantly spaced from the axis of the crank shaft and equidistant from one another. Connecting rods or links 18, 19 and 20 are pivotally connected with the crank 14 by having their end hubs journalled on the arbors 21, 22, and 23 projecting from a face plate 24 of a gear wheel 25; such arbors being equidistant from one another and equidistant from the axis of rotation of such gear wheel. The gear wheel 25 is journalled on an arbor 26 carried by the crank 7. The center of the arbor 26 in a radial direction is diametrically opposite to a radius intersecting the center of curvature of the shell 8 so that the gear wheel 25 and the shell 8 tend to counterbalance one another. The teeth of the gear wheel 25 mesh with the internal teeth of the ring 2 and the gear wheel 25 may rotate on its own axis and may track along the ring 2 and revolve bodily about the common axis of the shafts 4, 9 and 12.

The end of the shaft 4 opposite the crank 7 is also provided with a crank in both of the illustrated embodiments of my invention. In the embodiment illustrated in Figure 1, the crank consists of an arm 27 having a counterweight 28 at one end thereof and an arbor 29 on the opposite end thereof on which is mounted an antifriction bearing 30. A gear wheel 31 is mounted on the antifriction bearing 30 with its axis eccentric to the common axis of the shafts 4, 9 and 12 and with its peripheral teeth engaging the inwardly projecting teeth on the ring 3.

Arbors 32, 33 and 34 project from the face of the gear wheel 31 equidistant from one another and from the axis of rotation of the gear wheel 31. Connecting rods 35, 36 and 37 are pivotally connected with the gear wheel 31 by having their end hubs journalled on the arbors 32, 33 and 34, and the hubs on the opposite ends of the connecting rods are journalled on arbors 38, 39 and 40 projecting from a triple arm spider 41 forming a third rotor or crank on the crank shaft 42 which is journalled in antifriction bearing 43 and 44 carried by the bracket 45 on the frame 1. The arbors 38, 39 and 40 are equidistant from one another and equidistant from the axis of the shaft 41, which is coaxial with the shafts 4, 9 and 12.

In this embodiment of my invention power may be applied to the shafts 9 and 12 through wheels 46 and 47 which are fixed respectively to the respective shafts 9 and 12. The wheels 46 and 47 are selectively rotatable from a source of power (not shown) through a drum 48 and the selectively operable clutch bands 49 and 50. The energy transmitted through my mechanism may be applied to work at lower speed and higher torque than those of the drum 48 through any suitable coupling 51 on the crank shaft 42.

When power is applied to the wheel 47 from the rotating drum 48 through the clutch 50, the rotation of the shaft 12 and crank 14 imparts rotary motion to the gear 25 through the connecting rods 18, 19 and 20. When the rods and arbors are in the positions illustrated in Fig. 2, corresponding to twelve, four and eight o'clock on a clock dial, there may be slight play in the link 18 but there is no play in the links 19 and 20 if the apparatus is under load. The links 19 and 20 are then equidistant from a vertical center line and there is a constant push on one working rod and a pull on the other working rod and there is no radial thrust on the arbors of the gear wheel 25 or crank 14.

When the arbors are in positions corresponding to nine, one and five o'clock on a clock face, the arbors at nine o'clock position are twice as far from the vertical center line as are the arbors at one and five o'clock positions and the connecting rod connecting the arbors at nine o'clock positions take as much load as both the other two arbors.

This linkage design facilitates the static and dynamic balancing of the apparatus and lengthens the life of the bearings.

The rotation of gear wheel 25 causes it to track along the ring 2 and thereby turn the crank 7 and shafts 4 and 9 connected therewith oppositely to the shaft 12. Under such conditions, the shaft 9 and the wheel 46 thereon run idly. Since the pitch diameter of the gear wheel 25 is half that of the ring 2, the speed of rotation of the shaft 4 is the same as the speed of rotation of the shaft 12 but in the reverse direction.

The rotation of the shaft 4 and its crank 27 causes the gear wheel 31 to track around the ring 3, thereby rotating the gear wheel on its arbor 29. The rotation of the gear wheel 31 acts through the connecting rods 35, 36 and 37 to effect the rotation of the crank 41 and shaft 42. Since the pitch diameter of the wheel 31 is more than one-half the pitch diameter of the gear ring 3, the rotation of the shaft 42 is slower than the rotation of the shaft 4 and in reverse direction thereto. For instance, if the pitch diameter of the gear wheel 31 is two-thirds that of the ring 3, the speed of rotation of the shaft 42 will be one-half the speed of the shaft 4 but in the opposite direction. When the pitch diameter of the gear wheel is ¾ths, or ⅘ths, or ⅚ths, or $\tfrac{9}{10}$ths that of the gear ring, the speeds of the shaft 42 will be respectively ⅓rd, ¼th, ⅕th or ⅑th that of the shafts 4 and 12 and drum 48 and in the same direction as the latter.

When power is applied to the wheel 46 from the drum 48 through the clutch 49, rotary motion is transmitted through the shaft 9 and drum 8 directly to the crank 7 and shaft 4. The shaft 4 is rotated in the same direction as the drum 48 and rotates the shaft 42 reversely thereto but at a reduced speed. Under such conditions, the gear wheel 25, shaft 12 and wheel 47 run idly oppositely to the drum 48.

In the embodiment of my invention illustrated in Fig. 4, the end of the rotor or shaft 4 opposite the crank 7 is provided with a crank such as a disc or triple arm spider 54 similar to the spider 14 and provided with arbors 55, 56 and a third arbor (not shown), the arbors being spaced equidistantly from one another and from the axis of the shaft 4 in the manner shown in Fig. 3.

Connecting rods 58, 59 and a third rod (not shown) are pivotally connected with the crank 54 by having their end hubs journalled on the arbors 55, 56 and a third arbor (not shown, but similar to the showing of Fig. 3), and hubs on the opposite ends of these connecting rods are journalled on arbors 61, 62 and a third arbor (not shown, but similar to the showing on Fig. 3)

projecting from the face 64 of a gear wheel 65 mounted on an anti-friction bearing 66' carried by the arbor 66 projecting from the crank arm 67 of a crank shaft 68. The shaft 68 is journalled in an anti-friction bearing 71 carried by an arm 72 of the frame 1.

The peripheral teeth of the gear wheel 65 mesh with the teeth of the ring 3 and the weight of the gear wheel 65 and its connected parts are counterbalanced by a counterweight 69 at the end of an arm 70 projecting from the crank shaft 68 diametrically opposite to the crank arm 67.

The rotor or shaft 68 is coaxial with the shafts 4, 9 and 12 and the axis of rotation of the gear wheel 65 on the arbor 66 is eccentric to the common axis of the shafts 4, 9 and 12.

The arbors on the crank 54 are equidistant from one another and from the axis of the rotor or shaft 4 and the arbors on the gear wheel 65 are equidistant from one another and equidistant from the axis of rotation of the gear wheel 65 on the arbor 66.

The driving or rotor shaft 68 may be connected with any suitable source of power (not shown) and the shafts 9 and 12 have fixed thereon respectively the respective propellers 73 and 74 having blades normally so positioned that when the propellers are reversely rotated they propel air in the same direction, but the blades may be otherwise adjusted when so desired.

In this embodiment of my invention the gear wheel 65 is of greater pitch diameter than the radius of the ring 3 and hence when power is applied to the rotor or shaft 68 the rotor or shaft 4 is rotated reversely thereto and at reduced speed through the gear 65 and its connected links in the manner hereinbefore described in connection with the gear 31 and its connected links.

The rotation of the rotor or shaft 4 effects the rotation in the same direction of its extension shaft 9 and simultaneously effects rotation in the opposite direction of the rotor or shaft 12 through the gear 25 and its connecting rods. Since the gear wheel 25 is of one-half the pitch diameter of the ring 2, the shafts 9 and 12 and the propellers thereon rotate at the same speed but in opposite directions.

Having described my invention, I claim:

1. A transmission mechanism comprising three rotors, means connecting one of said rotors to another of said rotors, said means comprising a crank connected with one of said rotors, a wheel connected with the second of said rotors and connecting rods connecting said crank and wheel means connecting said last named rotor with the third rotor, said second named means comprising a wheel connected with the second named rotor, a crank connected with the third named rotor and connecting rods connecting said last named wheel and crank and concave reaction means engaged by said wheels.

2. A transmission mechanism comprising three rotors, means connecting one of said rotors to another of said rotors, said means comprising a crank connected with the first rotor and a wheel connected with the second rotor and connecting rods connecting said crank and wheel; means connecting said second named rotor with the third rotor, said last named means comprising a wheel connected with the second rotor and a crank connected with the third rotor and connecting rods connecting said wheel and crank; a rotary member, and means for transmitting energy to said second named rotor and member independently of said wheels and connecting rods.

3. A transmission mechanism comprising three crank shafts, means comprising a gear wheel and connecting rods connecting one of said crank shafts to a second crank shaft, means comprising a gear wheel and connecting rods connecting said last named crank shaft with said third crank shaft, said gear wheels and connecting rods each being pivotally connected with a crank of one of the three crank shafts aforesaid, and a toothed concave reaction means engaged by said gear wheels.

4. A transmission mechanism having a track comprising a pair of coaxial, internally toothed fixed rings, a crank shaft journalled in a bearing between said rings, a journaled crank shaft at each end of said first named crank shaft and coaxial therewith, means connecting said first named shaft with one of said second named shafts and comprising a gear wheel journalled eccentrically on one of said connected shafts and a plurality of connecting rods pivotally connected eccentrically with the other of said connected shafts and with said gear wheel, means connecting said first named shaft with the other of said second named shafts and comprising a gear wheel journalled eccentrically on one of said last named connected shafts and a plurality of connecting rods pivotally connected with the other of said last named connected shafts and with said last named gear wheel, and an extension on said first named shaft and forming a shaft coaxial with one of said second named shafts.

5. A transmission mechanism as set forth in claim 4 wherein the gear wheels are disposed symmetrically with respect to the axis of the first named shaft.

6. A transmission mechanism comprising a pair of rotors, means comprising a wheel and connecting rods connecting said rotors for transmitting energy from one to the other thereof, a fixed, concave track engaged by said wheel, and a pair of concentric shafts connected with one of said rotors and revoluble with and contra thereto.

7. A transmission mechanism comprising three rotors, means connecting one of said rotors to a second of said rotors, said means comprising a crank connected with the first rotor, a wheel connected with the second rotor, and connecting rods connecting said crank and wheel; means connecting said second named rotor with the third rotor, said second means comprising a wheel connected with the second rotor and a crank connected with the third rotor and connecting rods connecting said wheel and crank; and concave reaction means engaged by said wheels; the diameter of one wheel being one-half the diameter of the concave reaction means complementary thereto and the diameter of the other wheel exceeding one-half the diameter of the concave reaction means complementary thereto.

8. A transmission mechanism comprising circular reaction means, a series of rotors coaxial with said reaction means, means comprising a wheel and connecting rods connecting the first and second rotors of said series, said wheel having a diameter exceeding half the diameter of said reaction means and engaging the inner surface thereof, means comprising a wheel and connecting rods connecting the second rotor with a third rotor of said series, said wheel having a diameter approximately half the diameter of said reaction means, said second and third rotors having portions forming a pair of concentric shafts.

9. Power transmission mechanism comprising a pair of coaxial, rotatable, crank shafts and a fixed circular reaction means coaxial with said shafts, one of said shafts having a portion encircling a portion of the other of said shafts, means comprising a wheel and connecting rods connecting the cranks of said shafts, said wheel engaging said reaction means, driving wheels connected with the respective coaxial shafts, means for selectively rotating the respective driving wheels, and speed reduction mechanism having a power output shaft aligned with said first named shafts and rotatable therefrom.

10. Power transmission mechanism comprising a pair of coaxial, rotatable, power input shafts, one of which is journalled within the other, each of said shafts having a crank, clutch members connected with the respective shafts, a unidirectional, rotatable drum having means for selectively engaging the respective clutch members, means comprising a wheel and connecting rods connecting the cranks of said power input shafts, a fixed circular reaction means coaxial with said power input shafts and engaged by said wheel, and a power output shaft aligned with said power input shafts and rotatable from either of them.

11. Power transmission mechanism comprising a power input shaft, a speed reduction apparatus operable by said power input shaft, a power output shaft having a crank connected with and driven by said speed reduction mechanism, a second power output shaft journalled within said first power output shaft and having a crank, a wheel journalled eccentrically on the crank of said first named power output shaft, connecting rods connecting said wheel with the crank of said second named power output shaft, and a circular reaction means concentric with said power input shaft and power output shafts and engaged by said wheel.

JOHN S. SHARPE.

REFERENCES CITED

The following references are of record in the file of this patent:

UNITED STATES PATENTS

| Number | Name | Date |
|---|---|---|
| 1,770,016 | Ruliancich | July 8, 1930 |
| 1,992,333 | Stelzer | Feb. 26, 1935 |
| 2,170,733 | Sharpe | Aug. 22, 1939 |
| 2,174,483 | Sharpe | Sept. 26, 1939 |